J. I. HOKE.
TRACTOR.
APPLICATION FILED JULY 5, 1912.

1,159,223.

Patented Nov. 2, 1915.
3 SHEETS—SHEET 1.

WITNESSES:
A. H. Edgerton
O. M. McLaughlin

INVENTOR.
John I. Hoke.
BY
V. H. Lockwood
ATTORNEY.

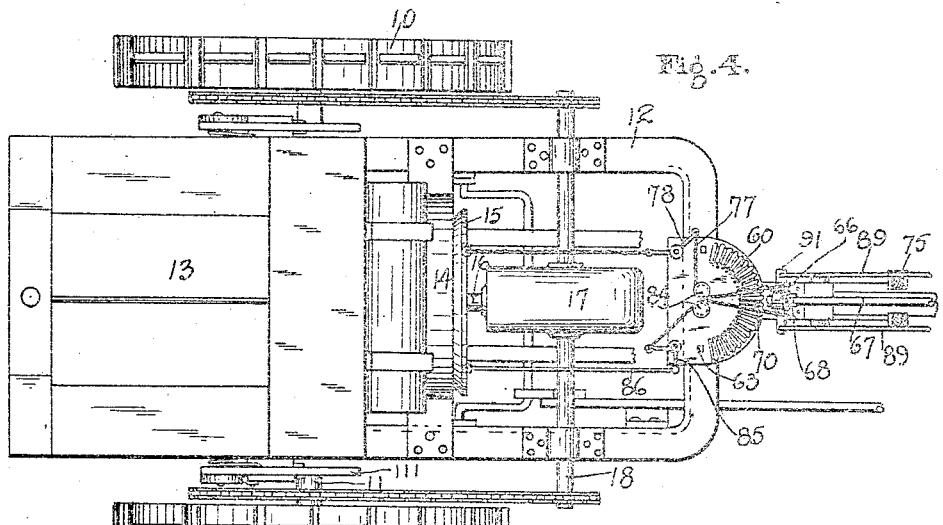
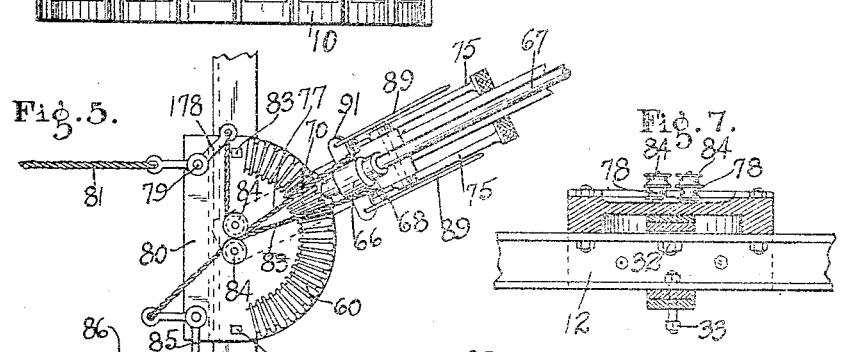
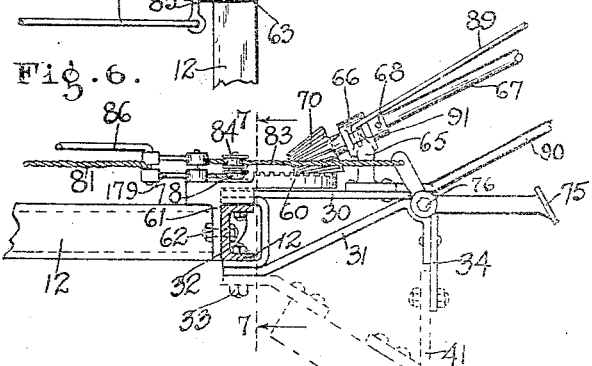

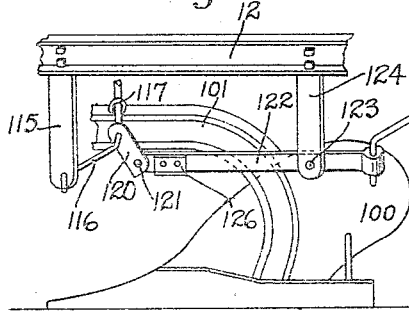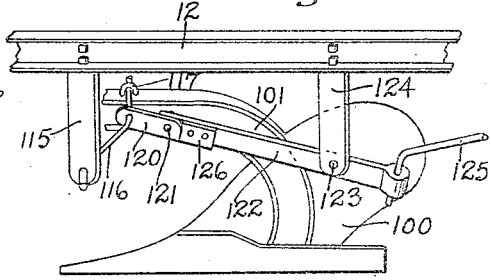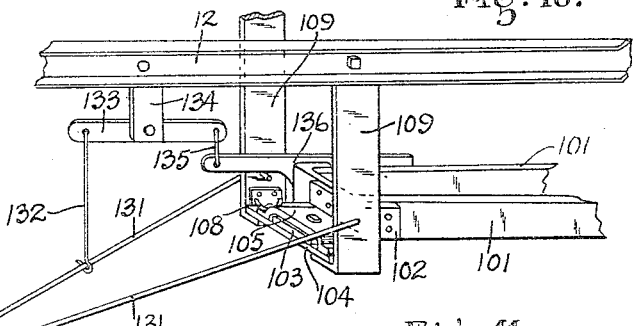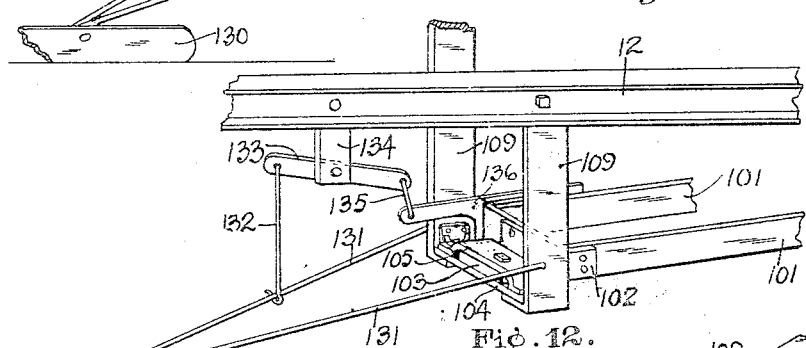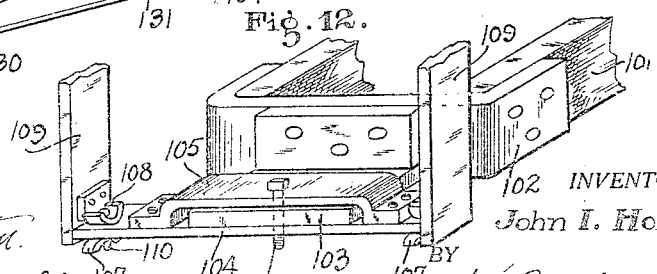

UNITED STATES PATENT OFFICE.

JOHN I. HOKE, OF FRANKFORT, INDIANA.

TRACTOR.

1,159,223.

Specification of Letters Patent.

Patented Nov. 2, 1915.

Application filed July 5, 1912. Serial No. 707,853.

*To all whom it may concern:*

Be it known that I, JOHN I. HOKE, a citizen of the United States, and a resident of Frankfort, county of Clinton, and State of Indiana, have invented a certain useful Tractor; and I do hereby declare that the following is a full, clear, and exact description thereof, reference being had to the accompanying drawings.

The object of this invention is to provide a practical two wheel tractor for agricultural and kindred uses, so as to gain many advantages over tractors having more than two wheels. One of these advantages is the reduction in cost, size and weight, the latter being important in agriculture because the ground is sometimes soft. Another advantage is the ability to make short turns in plowing corn or doing any other agricultural work. Still another advantage is that only one person is needed to operate both the tractor and the machines drawn by the tractor. This last is a very important advantage.

One feature of the invention consists in providing a flexible means for operating or controlling the tractor whereby the operator can operate or control the tractor from the vehicle or device drawn by the tractor, as well during sharp turns as when the vehicle members are in alinement with each other. This enables one person to operate both the tractor and the machine it is drawing. Thus if the tractor is drawing a mowing machine, the operator can sit on the mowing machine and raise and operate the cutter bar and operate the mowing machine and also operate the tractor and thus the need of two men be avoided.

Another feature of the invention consists in mounting all of the means for operating or controlling the tractor in connection with the tractor frame and preferably at the rear end thereof, instead of mounting said parts or any of them on the device drawn by the tractor and they will be in position to be operated by the operator sitting on the machine drawn by the tractor.

Still another feature of the invention consists of means at the rear end of the tractor frame for the ready mounting therewith of the machine to be drawn by the tractor and so that said machine will tend to maintain the frame of the tractor in its normally substantially horizontal position.

Figure 1:
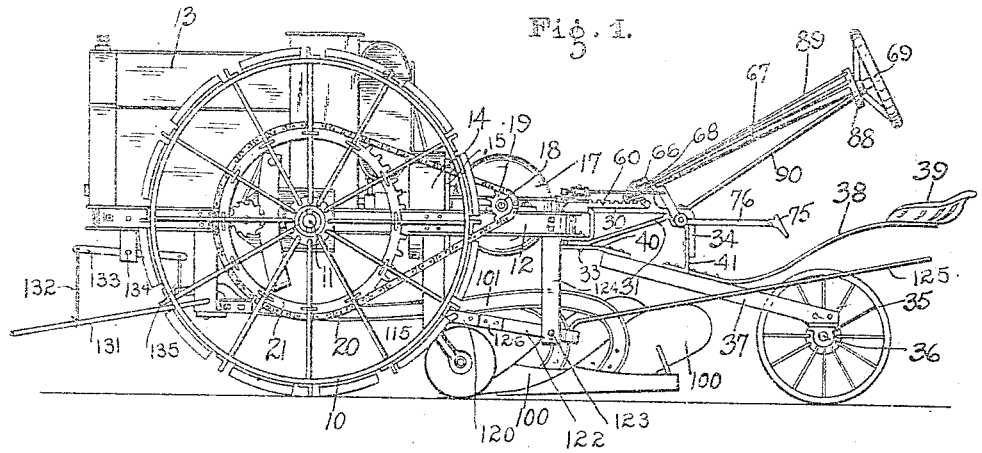
Figure 2:
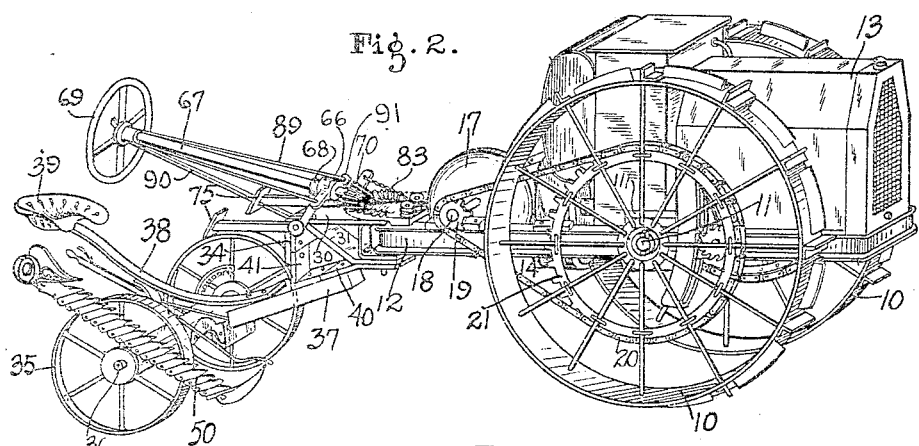
Figure 3:
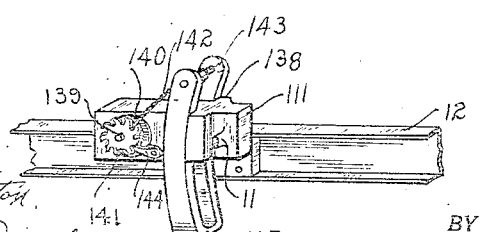

The nature of the invention will be understood from the accompanying drawings and the following description and claims:

In the drawings, Figure 1 is a side elevation of the tractor, a gang of plows drawn thereby and a vehicle for the operator drawn thereby, the plows being elevated. Fig. 2 is a perspective view of said tractor hitched to a mowing machine. Fig. 3 is a side elevation of the means for raising the frame on the supporting wheel. Fig. 4 is a plan view of the device. Fig. 5 is a plan view of the right hand portion of Fig. 4 with the guiding means turned to one side. Fig. 6 is a central vertical section through the rear portion of the tractor, the means for connecting the machine drawn by the tractor being indicated by dotted lines, parts being broken away. Fig. 7 is a section on the line 7—7 of Fig. 6. Fig. 8 is a side elevation of a part of the frame and a plow and means for attaching the plow, the plow being shown in the lowered position. Fig. 9 is the same with the plow elevated. Fig. 10 is a perspective view of the forward end of the plow beams and means for connecting the same in the frame and furrow guide. Fig. 11 is the same with the furrow guide elevated. Fig. 12 is a perspective view of the means for pivoting the forward end of the plow beams so that they may have horizontal and vertical play.

The tractor shown herein has two ground wheels 10 on a stub axle 11 carried by blocks 111 vertically adjustable in connection with a frame 12. Upon said frame there is an internal combustion engine 13 which drives a fly wheel 14. A clutch member 15, adapted to frictionally engage the inner periphery of said fly wheel, transmits power therefrom through a shaft 16 through differential gearing, not shown, within the gear case 17 through a shaft 18. This shaft carries a sprocket wheel 19 over which a sprocket chain 20 runs to an annular sprocket wheel 21 secured inside of the spokes of the ground wheel. The construction is the same on each side of the machine and differential gearing enables the mechanism to operate the same as the ordinary driven rear wheels of automobiles.

At the rear end of the main frame 12 there is a supplementary frame formed of the horizontal bar 30 which is mounted in connection with the main frame so as to be oscillatable horizontally, and an inclined bar 31. The forward end of the bar 30 lies upon the rear cross bar of the main frame 12 and is coupled therewith by a pin or bolt 32. The lower or inclined bar 31 is coupled with the same rear cross bar of the main frame 12 by a pin or bolt 33. From the rear end of this supplemental frame there is a rigid downwardly extending arm 34.

The vehicle drawn by the tractor, see Fig. 1, consists of a single wheel 35 on an axle 36 on which a bifurcated frame 37 is mounted which carries a seat spring 38 for the seat 39. The frame or tongue 37 has on its extreme front end a plate or arm 40 through which the pin or bolt 33 extends. There is also an upwardly extending arm 41 on said frame 37 which is bolted with the downwardly extending arm 34 of said supplemental frame. This connection between the rear part of the tractor frame and the frame of the vehicle drawn thereby is readily effected and the parts are as readily separated, but when they are connected, said rear member or vehicle supports and maintains the main frame of the tractor in a horizontal position. Without the attachment of said rear vehicle the tractor frame would have to be maintained horizontally by some additional support beneath it.

In Fig. 2 a mowing machine 50 is attached to the tractor frame, said mowing machine being of usual type and provided with a seat 39 for the operator and having a tongue cut over and detachably connected with the rear part of the tractor in the same manner as the frame 37 in Fig. 1. Any other sort of vehicle or agricultural implement, such as disk harrows or any other kinds of harrows or drags, can be hitched to the tractor in the same manner as is here shown, and will be drawn by it and will maintain the tractor frame horizontal. When any of these agricultural implements is coupled with the tractor frame in the manner specified, with the couplings 32 and 33 in vertical alinement with each other, it amounts to a pivotal coupling whereby each member of the total device is capable of horizontal oscillatory movement with reference to the other.

The steering mechanism is as follows: A segmental rack 60 is secured to the main frame above or upon the bar 30 of said supplemental frame by a downwardly extending plate 61 and bolts 62 going through said plate and the rear bar of the main frame 12, see Fig. 6. There are also two vertical bolts 63, see Fig. 5, passing through said segmental rack and rear bar of the frame 12, whereby said segmental rack is very rigidly secured in place on the main frame. Near the rear portion of said segmental rack a post 65 is mounted upon the bar 30 of said supplemental frame at the rear of the main frame and said post is provided with an inclined bearing 66 through which a steering shaft 67 extends and it is held in place by a collar 68. The outer end of the steering shaft has a steering wheel 69, while the inner end of said shaft carries a beveled pinion 70 which meshes with said rack. The steering shaft 67 is long enough preferably to bring the steering wheel 69 almost over the seat 39 and in convenient position for the occupant on the seat of the vehicle drawn by the tractor, whatever that vehicle may be, to conveniently reach and operate the steering wheel 69. Any operation of the steering wheel will cause a movement of the intermediate coupling between the two members of the total device, either to the right or to the left, and in this manner the frames of the tractor and vehicle drawn thereby near the coupling, will be drawn in an angular relation with each other, which will cause the tractor to turn or pursue a curved path. The turning effect of this steering means is double because it moves to one side or the other both the rear end of the tractor frame and the forward end of the vehicle frame and thereby a very sharp turn may be effected, as for instance in turning the corner of land being plowed, or turning around the ends of rows of corn being plowed, or turning the corner of squares of grain or clover or grass being cut. The mounting of the tractor on two wheels and the coupling mentioned bring about this very valuable result. In accomplishing this result it is observed that the supplemental frame formed of the parts 30, 31 and 34, is mounted in connection with and forms a part of the general frame work of the tractor and although it is oscillated in harmony with the frame of the drawn vehicle or agricultural implement, the steering mechanism is mounted on this oscillatory supplemental frame and hence is carried by the tractor instead of by the drawn vehicle or implement.

Not only is the steering mechanism carried by the tractor but also the other controlling mechanism, whatever it may be. For illustration there is shown herein a clutch 15 for coupling and uncoupling the engine shaft and fly wheel with the gearing for driving the propelling wheels. The means for controlling and operating said clutch consists of the pedals 75, each in the shape of a bell crank and pivoted between its ends on a bolt 76 in the rear part of the supplemental frame. There is one pedal on each side of the steering shaft and in position to be engaged by the feet of the operator sitting on the seat 39 of the vehicle drawn by the tractor. The right-hand pedal is connected with a cable 77 which passes between a pair of horizontal sheaves 78 located upon the segmental rack 60 and running to the right-hand bell crank lever 178, which is fulcrumed at 79 on a plate 80 projecting forward from the segmental rack and rigidly secured to the main frame of the tractor. From said lever 178 a cable 81 extends to the clutch member 15, see Fig. 4, so that operation of the right-hand pedal will draw the clutch 15 rearward to a disengaging position and stop the movement of the tractor. On the other hand, the left-hand pedal is connected by a cable 83 passing between a pair of pulleys 84 above the pulleys 78 and connected with a bell crank lever 85 similar to the bell crank lever 178 mounted on the plate 80 to the left of the center of the segmental rack and connected so that operation of the pedal will force one arm of the lever 85 inward and through the connecting rod 86 which runs to the clutch 15, force said clutch into engagement with the fly wheel 14 or other clutch member and thus couple such clutch arrangement so that the tractor will be driven, and the greater the pressure on the left-hand pedal 75, the greater the friction between the friction clutch members 14 and 15. A sheave of each pair of sheaves 78 and 84 are adjacent each other and the two cables pass between them and the joint between said sheaves should be concentric with the rack 60 so that the operation of said clutches can be of equal facility regardless of the relative angular positions of the tractor and the machine drawn thereby, or in other words, of the tractor main frame and the supplemental frame and the parts carried thereby. This arrangement is one of great importance for in making turns one way or the other; it is necessary that the steering wheel 69 and the pedals always be maintained in one position relative to the seat 39, so as to be accessible and convenient to be operated by the operator. The outer end of the steering shaft 67 is mounted in a bearing 88 held in position by braces 89 and 90. The braces 89 are connected with arms 91 extending in opposite directions from the post 66 on the supplemental frame. The brace 90 is connected with the rear part of the bar 30.

The foregoing parts apply to the device regardless of the kind of implement or vehicle drawn. The following parts adapt the device particularly for plowing. There is shown two breaking plows 100 having beams 101 extending from a point to the rear of the axle of the tractor to a point in front of said axle so that the draft of the plows is transmitted to the main frame of the plow in front of the axles. The two beams 101, see Fig. 10, are parallel and at their forward ends are secured to the ends of a U-shaped bar 102. A horizontal tongue or plate 103 extends forwardly from the U-shaped plate 102 and lies between the horizontal plates 104 and 105 and is connected with them by a bolt 106. The plate 105 is secured upon the plate 104 and spaced therefrom so as to leave a space between them for said tongue 103. The tongue 103 is of less width than said space between the plates 104 and 105 so as to permit horizontal oscillatory movement of the plow beams. The ends of the plate 104 lie between the convex surfaces of the brackets 107 and 108 mounted on the vertical bars 109 so that said plate is permitted a rocking movement whereby the beams of the plows may have to some extent a vertical oscillatory movement or play so that the plows may be raised and lowered.

The plows are raised and lowered by the following means. Bars 115 extend down from the main frame 12, see Fig. 8, and a crank rod 116 is mounted on said bars, the middle portion of said crank rod being horizontal, and passing through staples or eyes 117 secured to the beams 101. On each side of the beams a bar 120 is mounted on the middle portion of the crank rod 116 and when the plow is in its lower position, projects downward and at 121 is pivoted to a lever 122 which is fulcrumed at 123 in a bar 124 extending down from the main frame. This lever is operated by a long iron rod 125 which extends rearwardly to a point near the operator. This gives long leverage for operating the lever 122 and when the forward end is elevated, and said lever is operated sufficiently to bring itself and the bar 120 into alinement with each other, they are locked by a stop block 126 on the lever 122 against which the end of the bar 120 abuts. The lowered and elevated positions of the plow are shown in Figs. 8 and 9.

For guiding the tractor accurately while plowing so that one wheel of the tractor will always run in the furrow, there is provided in advance of the tractor a guide plate 130 which is vertical and beveled in its forward end and rigidly secured to two brace bars 131 which extend to the two bars 109, respectively, see Fig. 10, with which they are pivoted. The guide plate 130 runs in a furrow and it is held from escape by the sides of the furrow and slides along on the furrow by gravity. It is elevated out of the furrow when desired by the rod 132 engaging one of the brace rods 131 and connected with a lever 133 fulcrumed on a plate 134 extending down from the main frame 12. Said lever, in turn, is actuated by the link 135 which connects its rear end with an arm 136 secured to the side of one of the plow beams so that as the plow beams are tilted during the elevation of the plows, the guide 130 will be elevated out of the furrow, but when the plows are let down again for plowing, the guide 130 will be automatically lowered into the furrow.

For the purpose of beveling the frame to allow one wheel to travel in a furrow, the axles 11 for the tractor wheels are each mounted on the adjustable block 111, as heretofore mentioned, and there is a curved U-bar 137 secured to the frame 12 and surrounding said block 111 and bearing against projections 138 on said block. A shaft 139 is rotatably mounted near the opposite end of the block from the axle 11 and to said shaft a sheaved wheel 140 and a ratchet wheel 141 are secured and the projecting outer end of the shaft is squared so that a wrench may be applied to it for turning the same and winding or unwinding a cable 142 on said sheaved wheel, the other end of said cable being secured to a bolt 143 extending across the U-bar 137 above the block 111. A pawl 144 on the block 111 is adapted to engage the teeth of the ratchet 141 and prevent it from turning. By this means the frame may be raised or lowered, as desired.

While the main frame shown herein is rectangular and otherwise peculiarly-shaped and formed, still the invention is not limited to such main frame or to any particular kind of main frame, but to any structure carried by the wheels of the tractor and which carries the motor. Nor is it necessary, although it is preferable, to mount the coupling frame to the rear of the tractor wheels and the invention is not limited to any particular connection of the coupling frame.

I claim as my invention:

1. A tractor including a main frame, means for transmitting power from the motor to the wheels of the tractor for propelling the same, said transmitting means including a clutch, a frame pivotally mounted on said main frame so as to oscillate horizontally for coupling the tractor to the device to be drawn, and means for operating said clutch, which means is operable from said coupling frame and is flexible at a point in vertical alinement with the pivot of said coupling frame to the main frame.

2. A tractor including a main frame, means for transmitting power from the motor to the wheels of the tractor for propelling the same, said transmitting means including a clutch, a frame pivotally mounted on said main frame so as to oscillate horizontally for coupling the tractor to the device to be drawn, and means for operating said clutch, which means is mounted partially on the main frame and partially on the coupling frame and is flexible at a point in vertical alinement with the pivot of said coupling frame.

3. A tractor including a main frame, means for transmitting power from the motor to the tractor wheel including a clutch, a frame extending rearward from the main frame and pivoted thereto so as to be horizontally oscillatory, levers mounted in connection with said frame, flexible means operated by said levers, and means in substantially vertical alinement with the pivot of said pivotal frame for holding said flexible clutch actuated means so that the same may be operated with the pivotal frame at any angle with the main frame.

4. A tractor including a main frame, a motor, means for transmitting power from the motor to the wheel of the tractor for propelling the same, said transmitting means including a clutch, a coupling frame pivotally mounted on the rear part of said frame so as to have horizontal but not vertical oscillatory movement, a segmental rack secured on said main frame above said coupling frame, a steering shaft mounted on said coupling frame, a gear on one end of said shaft meshing with the rack, a steering wheel on the rear end of said steering shaft, levers fulcrumed on said coupling frame in position to be operated by a person while in sitting position to operate the steering wheel, and means actuated by the levers for controlling the clutch.

5. The combination of a tractor having a main frame, a motor thereon, means for transmitting power from the motor to the tractor wheels including a clutch, a segmental rack secured on the rear part of the main frame, a coupling frame pivotally mounted in connection with said coupling frame, a gear on the shaft meshing with said rack, a steering wheel on said shaft above and slightly in front of said seat, pedal levers mounted on said coupling frame in front of said seat so as to be actuated by an occupant of the seat, and means actuated by the pedal lever for controlling the clutch.

In witness whereof, I have hereunto affixed my signature in the presence of the witnesses herein named.

JOHN I. HOKE.

Witnesses:
G. H. BOINK,
O. M. McLAUGHLIN.